(12) United States Patent
Moniz et al.

(10) Patent No.: US 7,490,460 B2
(45) Date of Patent: Feb. 17, 2009

(54) GAS TURBINE ENGINE ASSEMBLY AND METHODS OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 11/253,935

(22) Filed: Oct. 19, 2005

(65) Prior Publication Data

US 2007/0084187 A1  Apr. 19, 2007

(51) Int. Cl.
F02K 3/00 (2006.01)

(52) U.S. Cl. .............. 60/268; 60/226.1; 60/39.162; 415/9

(58) Field of Classification Search ............. 60/228, 60/226.1, 39.162, 268; 415/9, 174.4; 416/2
See application file for complete search history.

(56) References Cited

U.S. PATENT DOCUMENTS

| | | | |
|---|---|---|---|
| 3,754,484 A | | 8/1973 | Roberts |
| 3,866,415 A | * | 2/1975 | Ciokajlo .............. 60/226.1 |
| 3,922,852 A | * | 12/1975 | Drabek ............... 60/226.1 |
| 4,744,214 A | * | 5/1988 | Monsarrat et al. ...... 60/226.1 |
| 4,751,816 A | * | 6/1988 | Perry ................. 60/226.1 |
| 4,969,325 A | * | 11/1990 | Adamson et al. ....... 60/226.1 |
| 5,010,729 A | * | 4/1991 | Adamson et al. ....... 60/226.1 |
| 5,394,967 A | * | 3/1995 | Bigley ................ 192/69.4 |
| 5,806,303 A | | 9/1998 | Johnson |
| 5,809,772 A | | 9/1998 | Giffin, III et al. |
| 5,813,214 A | | 9/1998 | Moniz et al. |
| 5,867,980 A | | 2/1999 | Bartos |
| 6,158,210 A | * | 12/2000 | Orlando .............. 60/226.1 |
| 6,381,948 B1 | * | 5/2002 | Klingels ............. 60/226.1 |
| 6,619,030 B1 | | 9/2003 | Seda et al. |
| 6,684,626 B1 | | 2/2004 | Orlando et al. |
| 6,711,887 B2 | | 3/2004 | Orlando et al. |
| 6,732,502 B2 | | 5/2004 | Seda et al. |
| 6,739,120 B2 | | 5/2004 | Moniz et al. |
| 6,763,652 B2 | | 7/2004 | Baughman et al. |
| 6,763,653 B2 | | 7/2004 | Orlando et al. |
| 6,763,654 B2 | | 7/2004 | Orlando et al. |
| 2005/0241292 A1 | | 11/2005 | Taylor et al. |

(Continued)

FOREIGN PATENT DOCUMENTS

EP  1577491 A1  9/2005

(Continued)

OTHER PUBLICATIONS

Search Report; Place of Search—Munich; dated Apr. 4, 2007; Ref. No. 172434/11819; Application No./Patent No. 06255322.7-2421; 8 pgs.

Primary Examiner—William H Rodríguez
(74) Attorney, Agent, or Firm—William Scott Andes, Esq.; Armstrong Teasdale LLP

(57) ABSTRACT

A gearbox includes a support structure, at least one sun gear coupled within the support structure, and a plurality of planetary gears coupled within the support structure. The support structure includes a first portion, an axially aft second portion, and a thrust spring coupled between the first and second portions.

16 Claims, 7 Drawing Sheets

U.S. PATENT DOCUMENTS

| | | | |
|---|---|---|---|
| 2007/0084183 A1* | 4/2007 | Moniz et al. | 60/204 |
| 2007/0084185 A1* | 4/2007 | Moniz et al. | 60/204 |
| 2007/0084187 A1* | 4/2007 | Moniz et al. | 60/204 |
| 2007/0084189 A1* | 4/2007 | Moniz et al. | 60/204 |
| 2007/0240399 A1* | 10/2007 | Orlando et al. | 60/39.162 |
| 2008/0000322 A1* | 1/2008 | Hillyer et al. | 74/665 G |
| 2008/0098716 A1* | 5/2008 | Orlando et al. | 60/226.1 |
| 2008/0148707 A1* | 6/2008 | Schilling | 60/39.162 |

FOREIGN PATENT DOCUMENTS

| | | |
|---|---|---|
| GB | 1207148 | 9/1970 |
| GB | 2019964 A | 11/1979 |

\* cited by examiner

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine and a low-pressure turbine coupled together in a serial flow relationship. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine positioned forward of the high-pressure turbine. The low-pressure turbine includes a rotor assembly having a fan coupled to a drive shaft. The low-pressure turbine rotatably drives the fan through the drive shaft. To facilitate increasing engine efficiency, at least one known gas turbine engine includes a counter-rotating low-pressure turbine that is coupled to a counter-rotating fan and/or a counter-rotating booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. Accordingly, the overall weight, design complexity and/or manufacturing costs of such an engine are increased.

BRIEF DESCRIPTION OF THE INVENTION

In one aspect, a method of assembling a turbine engine assembly is provided. The method includes providing a core gas turbine engine at least partially defined by a frame and having a drive shaft rotatable about a longitudinal axis of the core gas turbine engine, coupling a low-pressure turbine to the core gas turbine engine, coupling a counter-rotating fan assembly including a first fan assembly and a second fan assembly to the low-pressure turbine such that the first fan assembly rotates in a first direction and the second fan assembly rotates in an opposite second direction, coupling a gearbox between the shaft and the counter-rotating fan assembly so that the gear box extends substantially circumferentially about the drive shaft, coupling a gearbox input to the low-pressure turbine, coupling a gearbox output to the counter-rotating fan assembly, and coupling a thrust spring between the gearbox input and the gearbox to at least partially absorb the thrust generated by the counter-rotating fan assembly.

In another aspect, a gearbox is provided. The gearbox include a support structure, at least one sun gear coupled within the support structure, and a plurality of planetary gears coupled within the support structure. The support structure includes a first portion, an axially aft second portion, and a thrust spring coupled between the first and second portions.

In a further aspect, a turbine engine assembly is provided. The turbine engine assembly includes a core turbine engine, a low-pressure turbine coupled to the core turbine engine, a gearbox coupled to the low-pressure turbine, and a counter-rotating fan assembly coupled to the gearbox. The gearbox includes a gear support structure including a first portion, an axially aft second portion, and a thrust spring coupled between the first and second portions.

DETAILED DESCRIPTION OF THE INVENTION

Figure 1:
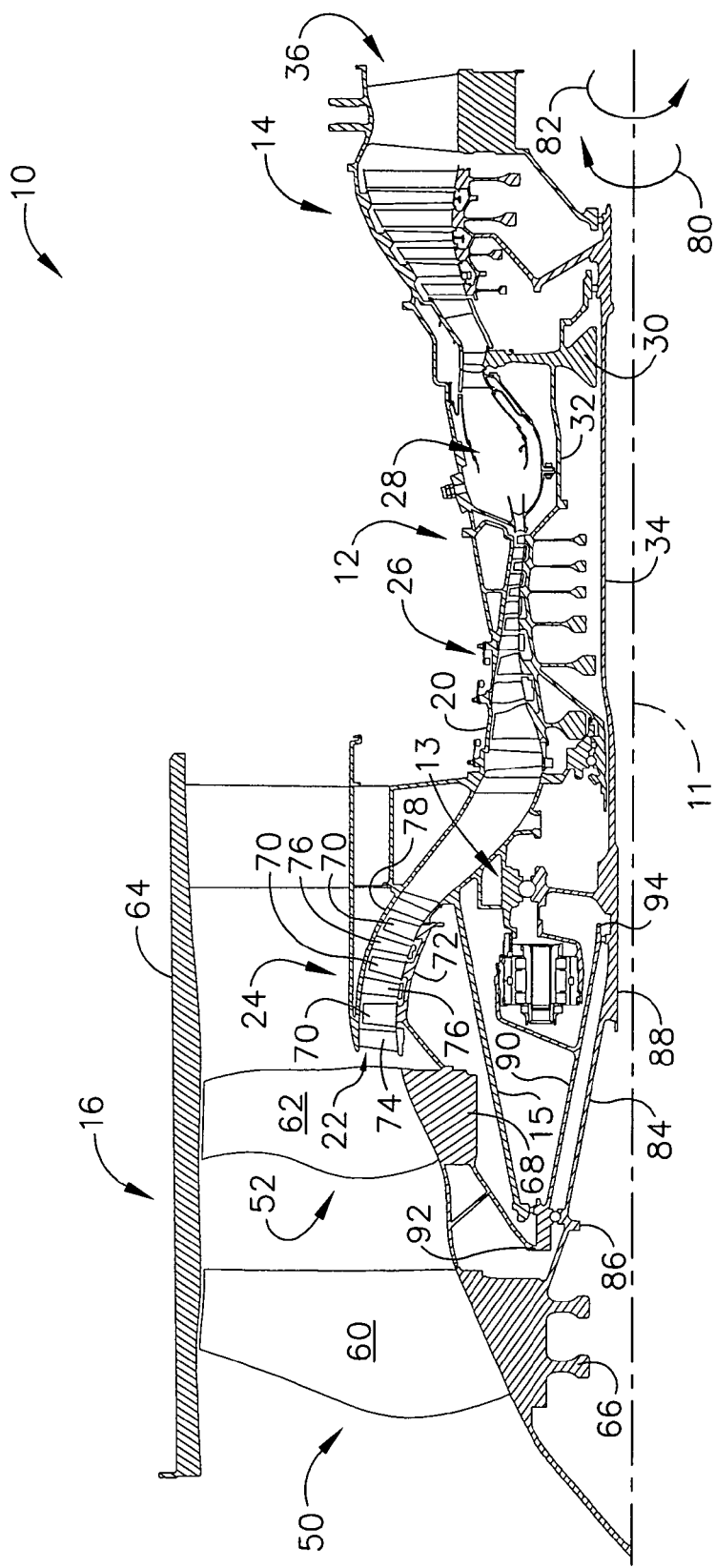
FIG. 1 is a cross-sectional view of a portion of an exemplary turbine engine assembly.

FIG. 1 is a cross-sectional view of a portion of an exemplary turbine engine assembly 10 having a longitudinal axis 11. In the exemplary embodiment, turbine engine assembly 10 includes a core gas turbine engine 12 generally defined by a frame 13. A low-pressure turbine 14 is coupled axially aft of core gas turbine engine 12 and a counter-rotating fan assembly 16 is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, core gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first rotatable drive shaft 32, and then to second or low-pressure turbine 14 to facilitate driving counter-rotating fan assembly 16 and booster compressor 24 through a second rotatable drive shaft 34 that is coupled coaxially with first drive shaft 32. After driving low-pressure turbine 14, the combustion products leave turbine engine assembly 10 through an exhaust nozzle 36 to provide propulsive jet thrust.

Figure 2:
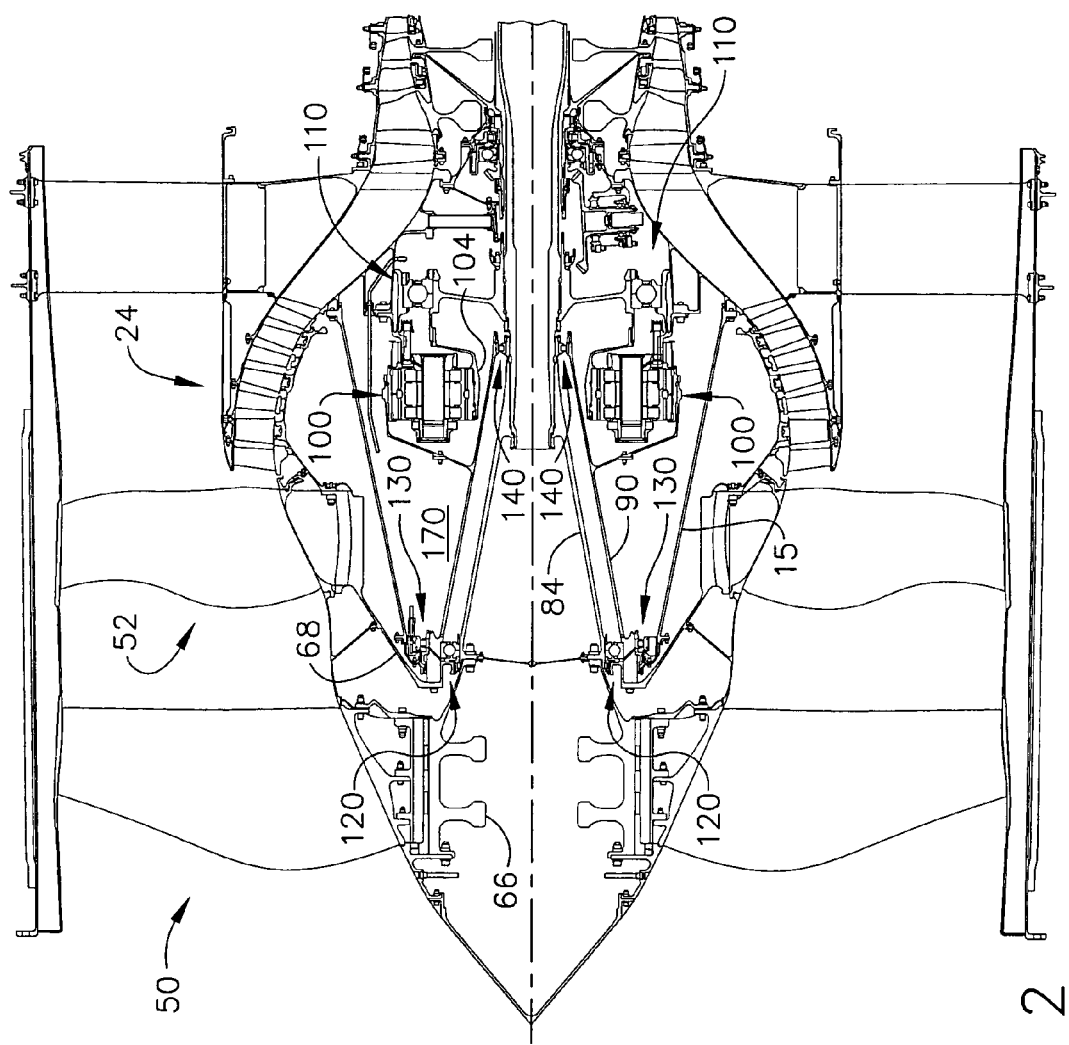
FIG. 2 is an enlarged cross-sectional view of a portion of a counter-rotating fan assembly shown in FIG. 1.
Figure 3:
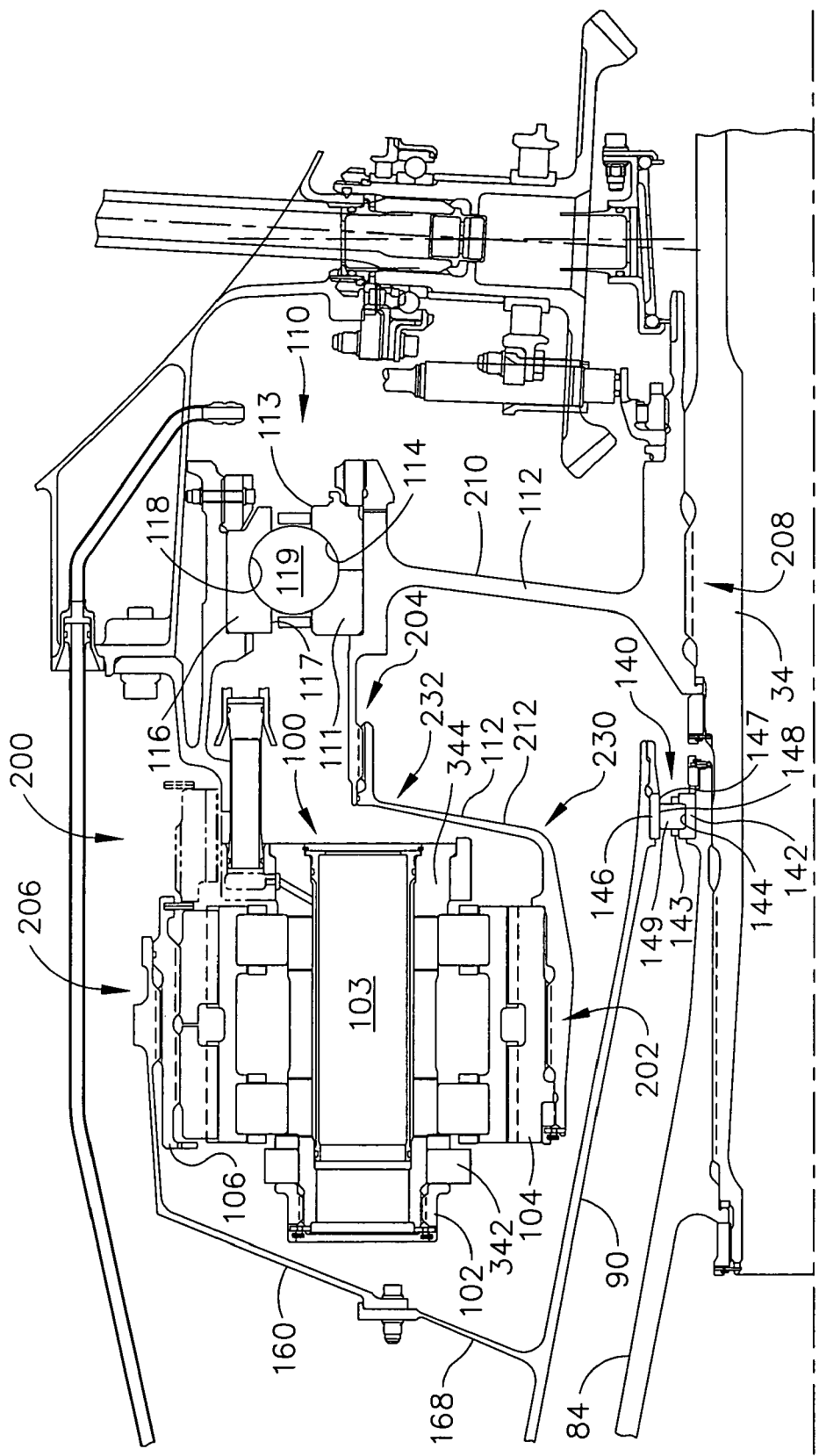
FIG. 3 is an enlarged cross-sectional view of a portion of the counter-rotating fan assembly shown in FIG. 2.

Counter-rotating fan assembly 16 includes a first or forward fan assembly 50 and a second or an aft fan assembly 52 configured to rotate about longitudinal axis 11. The terms "forward fan" and "aft fan" are used herein to indicate that fan assembly 50 is coupled axially upstream from fan assembly 52. In one embodiment, fan assemblies 50 and 52 are positioned at a forward end of core gas turbine engine 12, as shown in FIGS. 1-3. In an alternative embodiment, fan assemblies 50 and 52 are positioned at an aft end of core gas turbine engine 12. Fan assemblies 50 and 52 each includes at least one row of rotor blades 60 and 62, respectively, and are positioned within a nacelle 64. Rotor blades 60 are coupled to rotor disk 66 and rotor blades 62 are coupled to rotor disk 68.

In one embodiment, booster compressor 24 includes a plurality of rows of rotor blades 70 that are coupled to a respective rotor disk 72. Booster compressor 24 is positioned aft of an inlet guide vane assembly 74 and is coupled to aft fan assembly 52 such that booster compressor 24 rotates at a rotational speed that is substantially equal to a rotational speed of aft fan assembly 52. Although booster compressor 24 is shown as having only three rows of rotor blades 70, booster compressor 24 may have any suitable number and/or rows of rotor blades 70, such as a single row of rotor blades 70 or a plurality of rows of rotor blades 70 that are interdigitated with a plurality of rows of guide vanes 76. In one embodiment, inlet guide vanes 76 are fixedly or securely coupled to a booster case 78. In an alternative embodiment, rotor blades 70 are rotatably coupled to rotor disk 72 such that inlet guide vanes 76 are movable during engine operation to facilitate varying a quantity of air channeled through booster compressor 24. In another alternative embodiment, turbine engine assembly 10 does not include booster compressor 24.

As shown in FIG. 1, low-pressure turbine 14 is coupled to forward fan assembly 50 through shaft 34 such that forward fan assembly 50 rotates in a first rotational direction 80. Aft fan assembly 52 is coupled to drive shaft 34 and/or low-pressure turbine 14 such that aft fan assembly 52 rotates in an opposite second rotational direction 82.

FIG. 2 is a schematic diagram of a portion of counter-rotating fan assembly 16 shown in FIG. 1. In one embodiment, first fan assembly 50 includes a cone 84 positioned about longitudinal axis 11. Cone 84 is connected at a first or forward end 86 to rotor disk 66 and at a second or aft end 88 to drive shaft 34, as shown in FIG. 2. Second fan assembly 52 includes a cone 90 positioned coaxially about at least a portion of cone 84 along longitudinal axis 11. Cone 90 is coupled at a first or forward end 92 to rotor disk 68 and at a second or aft end 94 to an output of a gearbox 100 and/or to aft end 88 of cone 84 via a rolling bearing assembly, as described in greater detailed below.

FIG. 3 is a schematic diagram of a portion of the counter-rotating fan assembly 16 shown in FIG. 2. In one embodiment, counter-rotating fan assembly 16 also includes a gearbox 100 that is coupled between aft fan assembly 52 and drive shaft 34 to facilitate rotating aft fan assembly 52 in opposite rotational direction 82 with respect to rotational direction 80 in which forward fan assembly 50 rotates. Gearbox 100 has a generally toroidal shape and is configured to be positioned circumferentially about drive shaft 34 to extend substantially about drive shaft 34. As shown in FIG. 3, gearbox 100 includes a support structure 102, at least one gear 103 coupled within support structure 102, an input 104 and an output 106.

In one embodiment, gearbox 100 has a gear ratio of approximately 2.0 to 1 such that forward fan assembly 50 rotates at a rotational speed that is approximately twice the rotational speed of aft fan assembly 52. In another embodiment, forward fan assembly 50 rotates with a rotational speed that is between approximately 0.67 and approximately 2.1 times faster than the rotational speed of aft fan assembly 52. In this embodiment, forward fan assembly 50 may rotate at a rotational speed greater than, equal to or less than the rotational speed of aft fan assembly 52.

In one embodiment, a first bearing assembly, such as thrust bearing assembly 110 as shown in FIGS. 1-3, is positioned about drive shaft 34 and/or longitudinal axis 11. Thrust bearing assembly 110 operatively couples and/or is mounted between drive shaft 34 and frame 13 of core gas turbine engine 12 and is discussed further herein.

Figure 4:
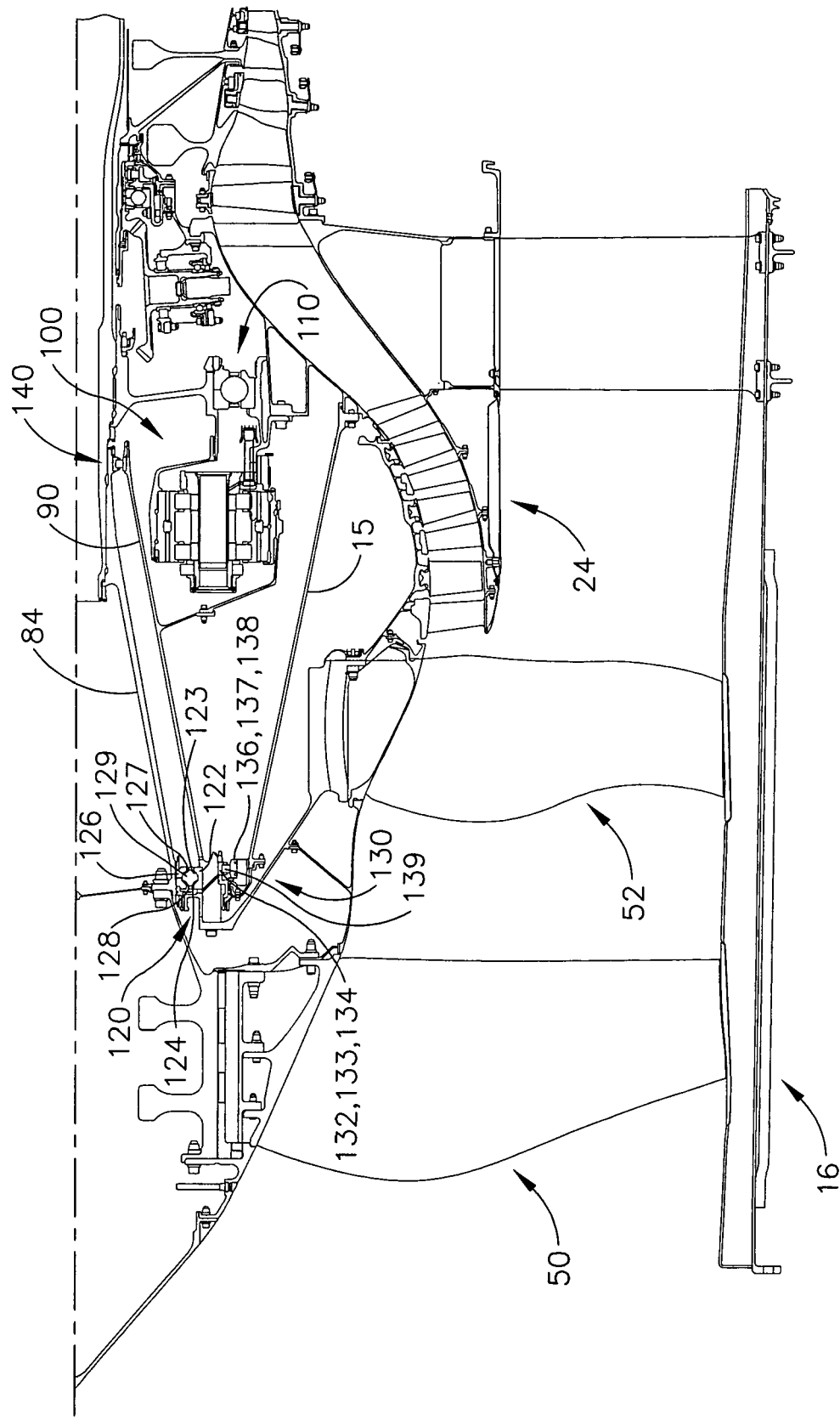
FIG. 4 is an enlarged cross-sectional view of a portion of the counter-rotating fan assembly shown in FIG. 2.

Referring to FIG. 4, a second bearing assembly, such as thrust bearing assembly 120, is positioned radially about longitudinal axis 11. In one embodiment, thrust bearing assembly 120 operatively couples and/or is mounted between a forward end portion of first fan assembly 50, such as at or near forward end 86 of cone 84, and a forward end portion of second fan assembly 52, such as at or near forward end 92 of cone 90. In one embodiment, thrust bearing assembly 120 includes a radially positioned inner race 122 that is mounted with respect to an outer surface of cone 84. As shown in FIG. 4, inner race 122 is mounted to cone 84 so that inner race 122 is rotatable about longitudinal axis 11 with first fan assembly 50. Inner race 122 has a surface 123 defining an inner groove 124 of thrust bearing assembly 110. Surface 123 defining inner groove 124 has a generally arcuate profile.

Thrust bearing assembly 120 includes a radially positioned outer race 126 that is mounted with respect to an inner surface of cone 90. As shown in FIG. 4, inner race 122 is mounted to cone 90 so that outer race 126 is rotatable about longitudinal axis 11 with second fan assembly 52. Outer race 126 has a surface 127, generally opposing surface 123, which forms an outer groove 128 of thrust bearing assembly 120. Surface 127 defining outer groove 128 has a generally arcuate profile. At least one roller element, such as a plurality of bearings 129, is movably positioned between inner race 122 and outer race 126. Each bearing 129 is in rolling contact with inner groove 124 and outer groove 128 to facilitate relative rotational movement of first fan assembly 50 and/or second fan assembly 52.

In one embodiment, thrust bearing assemblies 110 and/or 120 facilitate maintaining forward fan assembly 50 and/or aft fan assembly 52 in a relatively fixed axial position. During operation of counter-rotating fan assembly 16, thrust loads and/or forces generated by first fan assembly 50 are transferred directly from first fan assembly 50 to first thrust bearing assembly 110. Further, thrust loads and/or forces generated by second fan assembly 52 and/or booster compressor 24 during operation are transferred from second fan assembly 52 and/or booster compressor 24 to second thrust bearing assembly 120 and from second thrust bearing assembly 120 through drive shaft 34 to first thrust bearing assembly 110. As a result of transferring thrust loads and/or forces to thrust bearing assembly 110 and/or thrust bearing assembly 120, the transfer of thrust loads and/or forces through gearbox 100, operatively coupled to second fan assembly 52, is prevented or limited. In alternative embodiments, any suitable bearing assembly known to those skilled in the art and guided by the teachings herein provided can be used for or in addition to bearing assembly 110 and/or bearing assembly 120.

In one embodiment, a bearing assembly, such as roller bearing assembly 130, is positioned about the outer surface of cone 90 at or near forward end 92, as shown in FIG. 4. Roller bearing assembly 130 is connected between frame 13 and forward end 92. In one embodiment, roller bearing assembly 130 acts as a differential bearing assembly in combination with thrust bearing assembly 120 to support second fan assembly 52 and/or transfer thrust loads and/or forces from second fan assembly 52 to frame 13. In one embodiment, roller bearing assembly 130 includes an inner race 132 that is mounted with respect to cone 90, as shown in FIG. 4. Inner race 132 is mounted to forward end 92 of cone 90 so that inner race 132 is rotatable about longitudinal axis 11 with second fan assembly 52. Inner race 132 has a surface 133 defining an inner groove 134 of roller bearing assembly 130.

Roller bearing assembly 130 includes an outer race 136 that is securely coupled to frame 13. In one embodiment, outer race 136 is securely coupled with respect to structural support member 15 and/or frame 13. Structural support member 15 and/or frame 13 acts as a ground for the transfer of thrust loads and/or forces developed or generated by counter-rotating fan assembly 16 and/or booster compressor 24. Outer race 136 has a surface 137, generally opposing surface 133, which forms an outer groove 138 of roller bearing assembly 130. At least one roller element, such as a plurality of rollers 139, is movably positioned between inner race 132 and outer race 136. Each roller 139 is in rolling contact with inner groove 134 and outer groove 138.

In one embodiment, a bearing assembly, such as roller bearing assembly 140, is positioned about the outer surface of cone 84 at or near aft end 88, as shown in FIG. 3. Roller bearing assembly 140 is connected between cone 84 and cone 90. Roller bearing assembly 140 includes an inner race 142 that is mounted with respect to aft end 88, as shown in FIG. 2. Inner race 142 is mounted to cone 84 so that inner race 142 is rotatable about longitudinal axis 11 with first fan assembly 50. Inner race 142 has a surface 143 defining an inner groove 144 of roller bearing assembly 140.

Roller bearing assembly 140 includes an outer race 146 that is mounted with respect to aft end 94 of cone 90, as shown in FIG. 3. Outer race 146 is mounted to cone 90 so that outer race 146 is rotatable about longitudinal axis 11 with second fan assembly 52. Outer race 146 has a surface 147, generally opposing surface 143, which forms an outer groove 148 of roller bearing assembly 140. At least one roller element, such as a plurality of rollers 149, is movably positioned between inner race 142 and outer race 146. Each roller 149 is in rolling contact with inner groove 144 and outer groove 148 to facilitate relative rotational movement of cone 84 and/or cone 90.

In this embodiment, roller bearing assemblies 130 and 140 facilitate providing rotational support to aft fan assembly 52 such that aft fan assembly 52 can rotate freely with respect to forward fan assembly 50. Accordingly, roller bearing assemblies 130 and 140 facilitate maintaining aft fan assembly 52 in a relatively fixed radial position within counter-rotating fan assembly 16. In alternative embodiments, any suitable bearing assembly known to those skilled in the art and guided by the teachings herein provided can be used for or in addition to bearing assembly 130 and/or bearing assembly 140.

In one embodiment, gearbox 100 is connected to a fixed or stationary component of gas turbine engine 10, such as frame 13 of core turbine engine 12, as shown in FIG. 3. Gearbox input 104 is rotatably coupled to second drive shaft 34 through drive shaft extension 112 that is splined to drive shaft 34. Gearbox output 106 is rotatably coupled to aft fan assembly 52 through an output structure 160. A first end of output structure 160 is splined to gearbox output 106 and a second end of output structure 160 is coupled to aft fan forward shaft 168 to facilitate driving aft fan assembly 52.

Referring to FIG. 3, in one embodiment, gas turbine engine assembly 10 includes a spline system 200 for mounting gearbox 100 to counter-rotating fan assembly 16. Gearbox 100 is fixedly or securely coupled to frame 13 of core gas turbine engine 12, for example at gearbox support structure 102. Spline system 200 isolates gearbox 100 from first fan assembly 50 and/or second fan assembly 52 to prevent or limit thrust loads and/or forces exerted on gearbox 100 as a result of counter-rotating fan assembly 16 operation. First fan assembly 50 is rotatably coupled to input 104 such that first fan assembly 50 rotates in a first direction, as indicated by rotational arrow 80 in FIG. 1. Second fan assembly 52 is rotatably coupled to output 106 such that second fan assembly 52 rotates in a second direction, as indicated by rotational arrow 82 in FIG. 1, opposite the first direction.

As shown in FIG. 3, spline system 200 includes a plurality of spline assemblies, such as spline assembly 202, 204, 206 and/or 208. In one embodiment, a first spline assembly 202 couples input 104 to drive shaft extension 112. Drive shaft extension 112 includes a first portion 210 and a second portion 212, as shown in FIG. 3. First spline assembly 202 couples input 104 to first portion 10 and a second spline assembly 204, the same or similar to first spline assembly 202, couples first portion 210 to second portion 212 to rotatably couple input 104 to drive shaft 34. Further, second spline assembly 204 facilitates movement of thrust bearing assembly 110 with respect to gearbox 100 in the axial direction, i.e., along or parallel with longitudinal axis 11 of turbine engine assembly 10.

In one embodiment, spline assembly 204 includes a member forming a plurality of splines positioned about a periphery of the member. The member, connected to second portion 212 of drive shaft extension 112, is positionable within a cavity formed in a cooperating housing, connected to first portion 210, such that the plurality of splines mesh or interfere with slots formed on an inner periphery of the housing to transfer torsional loads and/or forces from second portion 212 to first portion 210 of drive shaft extension 112. Further, the member is positioned within the cooperating housing to facilitate movement of the member within the housing in an axial direction, e.g., along or parallel with longitudinal axis 11, which facilitates axial movement of second portion 212 with respect to first portion 210.

In one particular embodiment, each spline assembly 204, 206 and 208 are the same or similar, as described above with reference to spline assembly 204. A third spline assembly 206 slidably couples output 106 to output structure 160. Third spline assembly 206 facilitates axial movement of aft fan forward shaft 168 with respect to gearbox 100. In one embodiment, a fourth spline assembly 208 slidably couples second portion 212 of drive shaft extension 112 to drive shaft 34. During operation, spline assemblies 202, 204, 206 and/or 208 pass only torsional or torque loads and/or forces to gearbox 100 such that gearbox 100 remains in a substantially fixed position with respect to the frame of low-pressure turbine 14.

In one embodiment, drive shaft extension 112 and/or output structure 160 include at least one flexible arm compensating for a radial deflection of gearbox 100. In a particular embodiment, first portion 210 includes a radially inner portion 230 that is coupled to input 104 through spline assembly 202 and a radially outer portion 232 that is coupled to second portion 212 through spline assembly 204. First portion 210 has a first thickness at or near inner portion 230 and a second thickness at or near outer portion 232, which is less than first thickness. In this particular embodiment, a thickness of first portion 210 gradually decreases from radially inner portion 230 to radially outer portion 232. The second thickness is selected such that first portion 230 will separate from second portion 232, i.e. first portion 210 will break, when first portion 210 is subjected to a determined torsional load and/or force. During operation of engine assembly 10, relatively large radial loads and/or forces may be applied to aft fan assembly 52. To compensate for the relatively large radial loads and/or forces, and to ensure continued engine operation, in one embodiment first portion 210 breaks such that forward fan assembly 50 continues to operate as aft fan assembly 52 freewheels.

During operation, as second drive shaft 34 rotates, second drive shaft 34 causes input 104 to rotate in first rotational direction 80, which subsequently rotates output 106 in opposite second rotational direction 82. Because output structure 160 is coupled to aft fan assembly 52, drive shaft 34 causes aft fan assembly 52 to rotate via gearbox 100 in opposite second direction 82. In one embodiment, gearbox 100 is located within a sump 170 at least partially defined between output structure 160 and structural support member 15 configured to support aft fan assembly 52. During operation, gearbox 100 is at least partially submerged within lubrication fluid contained in sump 170 to continuously lubricate gearbox 100 during engine operation.

Figure 5:
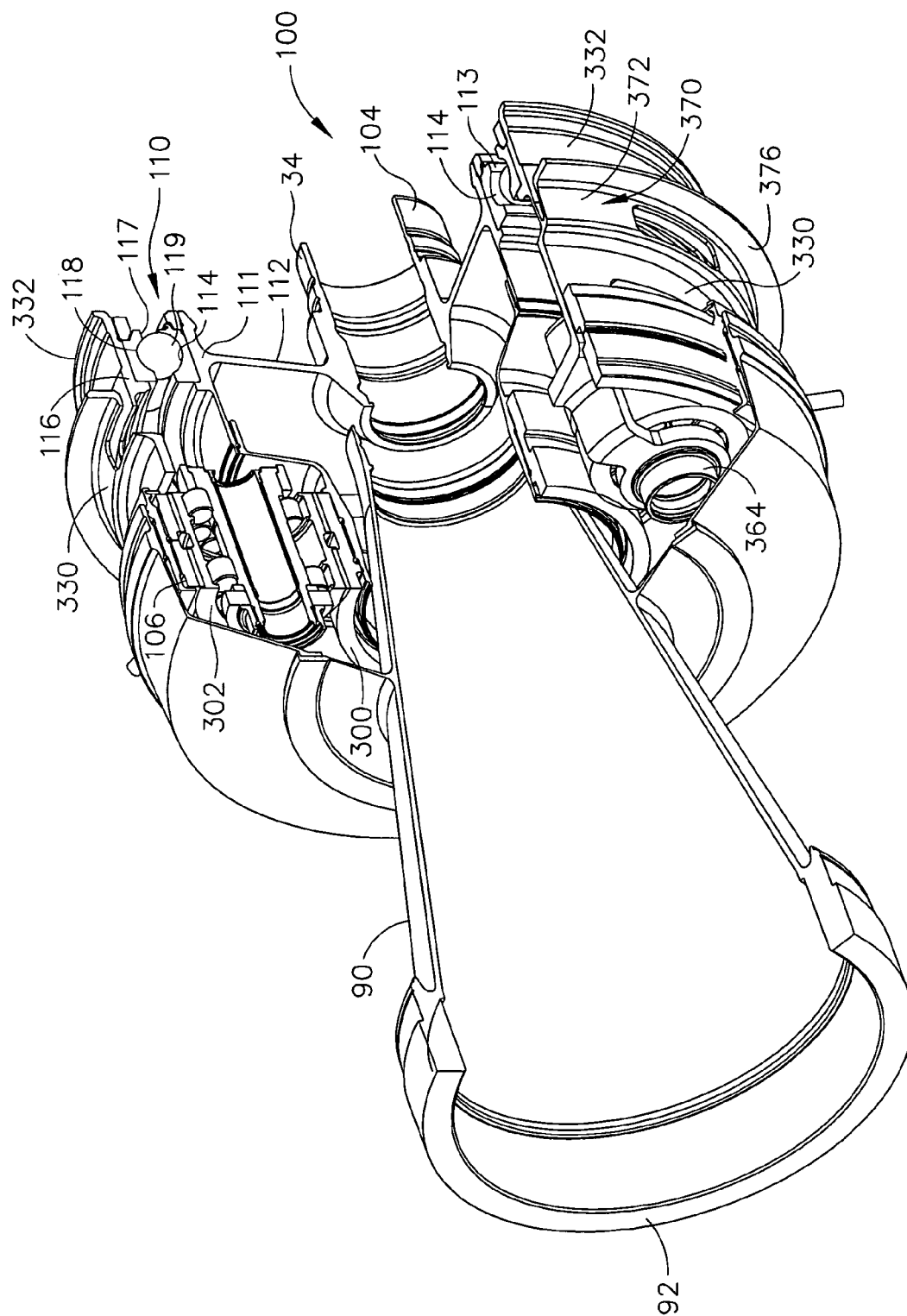
FIG. 5 is a perspective view of a gearbox shown in FIG. 4.
Figure 6:
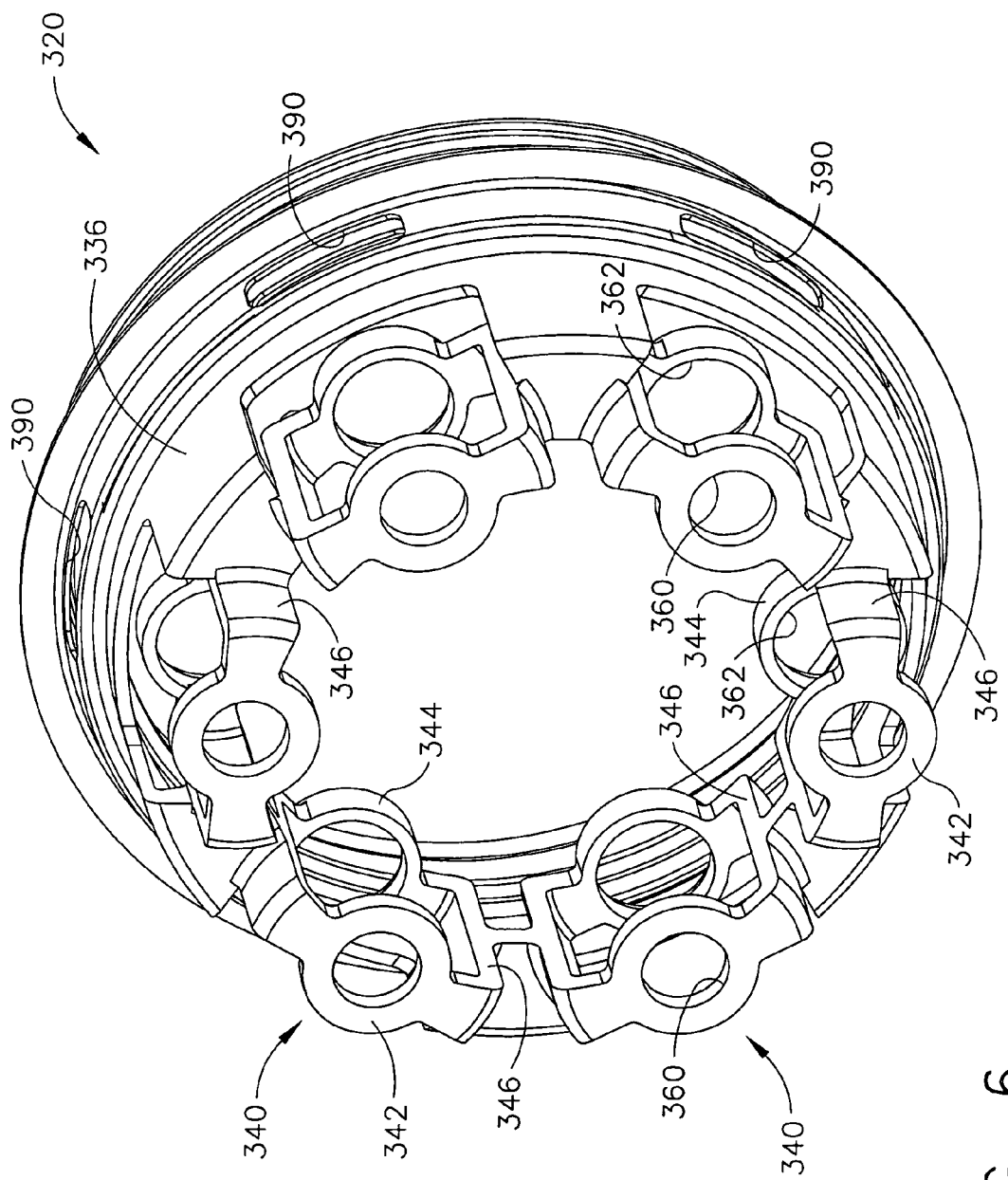
FIG. 6 is a perspective cut-away view of the gearbox shown in FIG. 5.
Figure 7:
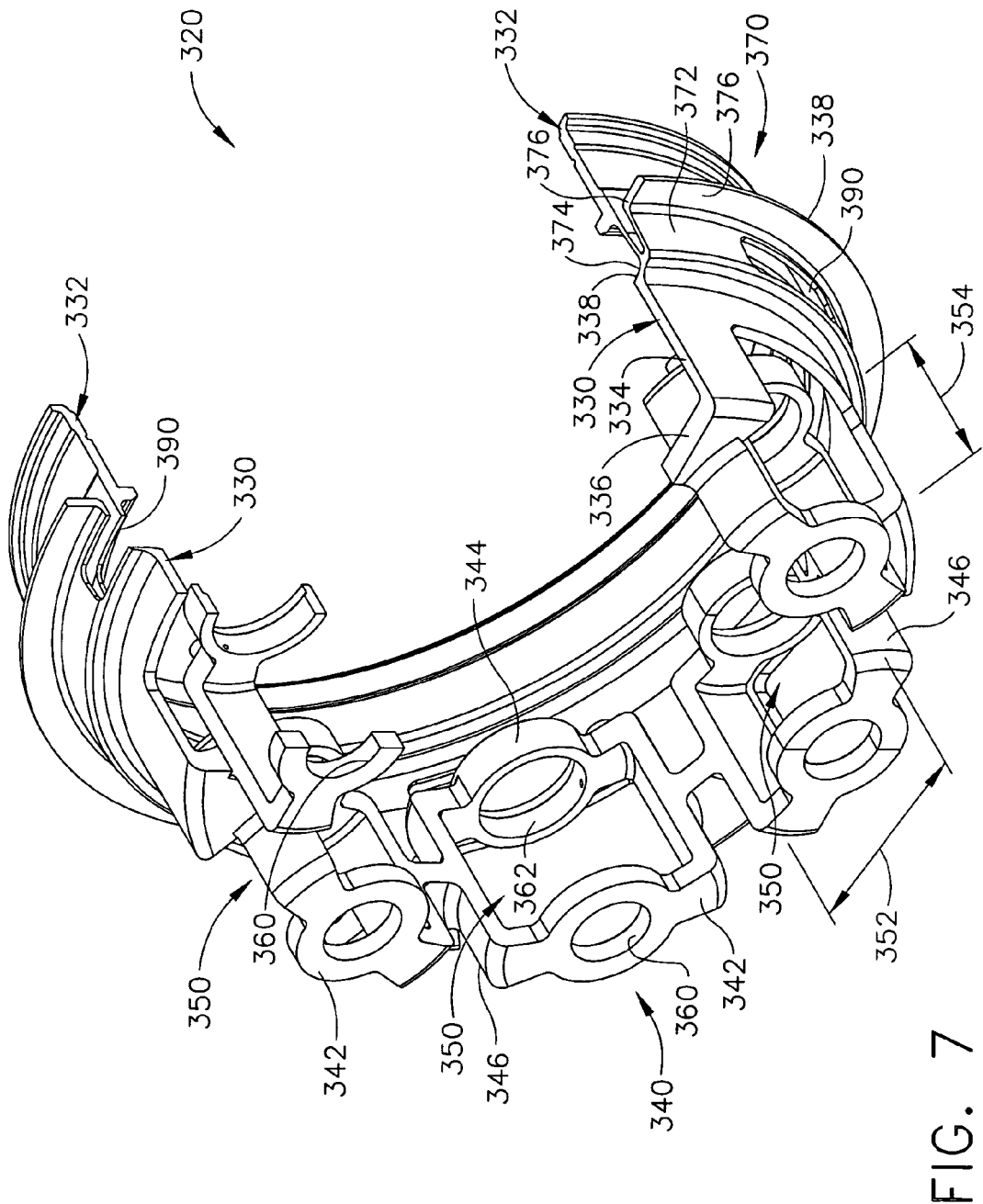
FIG. 7 is a perspective view of a portion of the gearbox shown in FIG. 6.

FIG. 5 is a perspective view of gearbox 100. FIG. 6 is a perspective cut-away view of gearbox 100. FIG. 7 is a perspective view of a portion of gearbox 100. In the exemplary embodiment, gearbox 100 includes a least one first or sun gear 300 that is coupled to input 104, and a plurality of second or planetary gears 302 that are each rotatably coupled to sun gear 300. Specifically, gearbox 100 includes sun gear 300 and a set of planetary gears 302 cooperating to produce differential speeds. Accordingly, sun gear 300 is directly coupled to shaft 32, via input 104, and planetary gears 302 are disposed to intermesh with sun gear 300 to facilitate driving aft fan assembly 52 and booster compressor 24 via output 106.

More specifically, gearbox 100 includes a unitary support structure 320 also referred to as a gorilla cage as is configured to support sun gear 300 and planetary gears 302. In the exemplary embodiment, support structure 320 is substantially cylindrically shaped and includes a first portion 330 and a second portion 332 extending from first portion 330. In the exemplary embodiment, second portion 332 is configured to house thrust bearing 110 and provide structural support for sun gear 300, and first portion 330 is configured to provide structural support for both of sun gear 300 and planetary gears 302. In the exemplary embodiment, first and second portions 330 and 332 are formed as a unitary structure.

First portion 330 includes a body portion 334 having a first end 336 that extends radially inwardly from body portion 334 and a second end 338 that extends radially outwardly from body portion 334. More specifically, support structure 320 includes a plurality of planetary gear support structures 340 that are formed integrally with first portion 330 and thus support structure 320. Each planetary gear support structure 340 is selective sized to support a respective planetary gear 302 and includes a radially forward bearing support structure 342, a radially aft bearing support structure 344, and a pair of connecting members 346 to facilitate coupling forward support structure 342 to aft support structure 344. In the exemplary embodiment, support structure 320 includes six planetary gear support structures 340, i.e. gearbox 100 includes six planetary gears 302, that are arranged approximately equidistantly around axis 11. Optionally, gearbox 100 and support structure 320 can be configured to support any quantity of planetary gears 302.

During assembly forward bearing support structure 342, radially aft bearing support structure 344, and connecting members 346 are fabricated as a unitary component with structure 302 and having a substantially rectangular cross-sectional profile that defines an opening 350 therethrough to facilitate installing each respective planetary gear 302 within a respective planetary gear support structure 340. More specifically, during assembly, planetary gear 302 is positioned within opening 350 and secured to support structure 320. Accordingly, bearing support structure 342 and 344 each have a width 352 and each pair of connecting members 346 each have a length 354 such that opening 350 is sized to receive a respective planetary gear 302.

Additionally, forward bearing support structure 342 and aft bearing support structure 344 each include an opening 360 and 362, respectively, extending therethrough. During assembly, planetary gear 302 is positioned within opening 350, a fastener 364 is inserted through opening 360, through a respective planetary gear 302, and through opening 362 to facilitate securing and/or coupling a respective planetary gear 302 to support structure 320.

Support structure 320 also includes a substantially z-shaped portion 370 that includes a body portion 372, a first end 374 that is formed unitarily with first body portion 330 second end 338 and extending radially inwardly from body portion 372, and a second end 376 extending radially outwardly from body portion 372. In the exemplary embodiment, second portion 332 is coupled to z-shaped portion 338 to form a spring 370.

Accordingly, support structure 320 including spring 370 are flexible in an axial direction and therefore facilitate absorbing the thrust loading generated by counter-rotating fan assembly 16. In the exemplary embodiment, support structure 320 is fabricated from a metallic material that is selected to further absorb the thrust load.

In the exemplary embodiment, support structure 320 also includes a plurality of slots and/or openings 390 to further facilitate absorbing the thrust load generated by counter-rotating fan assembly 16. Specifically, support z-shaped portion 338, i.e. spring 338 includes a plurality of openings 390 extending therethrough to facilitate softening and/or stiffening spring 338. For example, increasing the quantity of openings 390 extending through spring 338 increasing the axially stiffness of support structure 320, whereas decreasing the quantity of openings 190 facilitates decreasing or softening the axially stiffness of support structure 320.

Referring further to FIG. 3, in one embodiment, thrust bearing assembly 110 includes a radially positioned inner race 111 that is mounted with respect to drive shaft 34. As shown in FIG. 3, inner race 111 is mounted to a drive shaft extension 112 operatively coupled to drive shaft 34 so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile.

Gearbox 100 also includes thrust bearing 110 housed within support structure 320. More specifically, thrust bearing assembly 110 includes a radially positioned inner race 111 that is mounted with respect to drive shaft 34. As shown in FIG. 5, inner race 111 is mounted to a drive shaft extension 112 operatively coupled to drive shaft 34, via input 104, so that inner race 111 is rotatable about longitudinal axis 11 with drive shaft 34. In one particular embodiment, drive shaft extension 112 is splined to drive shaft 34. Inner race 111 has a surface 113 defining an inner groove 114 of thrust bearing assembly 110. Surface 113 defining inner groove 114 has a generally arcuate profile. Thrust bearing 110 also includes a radially positioned outer race 116 that is securely coupled to support structure first portion 330. In one embodiment, outer race 116 and/or support structure first portion 330 act as a ground for the transfer of thrust loads and/or forces developed or generated by counter-rotating fan assembly 16 and/or booster compressor 24. Outer race 116 has a surface 117, generally opposing surface 113, which forms an outer groove 118 of thrust bearing assembly 110. Surface 117 defining outer groove 118 has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to gearbox 100. As such, thrust bearing 110 is housed within support structure 320, and thus gearbox 100, to facilitate reducing the complexity of the gas turbine engine and thus the costs of manufacturing the gas turbine engine.

The above-described support structure provides a cost-effective and highly reliable thrust assembly that includes a substantially cylindrically shaped support structure that is configured to house the gears utilized to drive the counter-rotating fan assembly. The support structure also includes an integrally formed spring assembly that facilitates absorbing the thrust loads generated by the counter-rotating fan assembly. Additionally, the spring assembly includes a plurality of openings extending therethrough, a quantity of which is selected based on the thrust loads desired to be absorbed by the support structure. The support structure also includes an integrally formed thrust bearing assembly that further absorbs thrust loads generated by the counter-rotating fan assembly. Accordingly, a thrust path is created between the power turbine thrust bearing and the gas turbine engine in a cost-effective manner.

More specifically, the gearbox described herein include a thrust bearing that is incorporated into the gearbox assembly to reduce weight and increase cost savings. Moreover, the gear housing or support structure is a single piece structure that includes drop in planet gears for further weight reduction and increased stiffness. The housing flange, is connected to the main frame. Accordingly, the gearbox provides a compact design which itself will result in engine weight savings, wherein a slotted squirrel cage type spring housing is incorporated in the gearbox mount flange and wherein adjusting the size and quantity of these spring arms will enable optimum system performance between the gearbox, thrust bearing and low-pressure turbine.

An exemplary embodiment of gas turbine engine gearbox is described above in detail. The gearbox is not limited to the specific embodiments described herein, but rather, components of the assembly may be utilized independently and separately from other components described herein. Moreover, the gearbox described herein can also be used in combination with a variety of gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a core gas turbine engine at least partially defined by a frame and having a drive shaft rotatable about a longitudinal axis of the core gas turbine engine;
   coupling a low-pressure turbine to the core gas turbine engine;
   coupling a counter-rotating fan assembly including a first fan assembly and a second fan assembly to the low-pressure turbine such that the first fan assembly rotates in a first direction and the second fan assembly rotates in an opposite second direction;
   coupling a gearbox between the shaft and the counter-rotating fan assembly so that the gear box extends substantially circumferentially about the drive shaft, the gearbox including a support structure including a first portion and a second portion;
   coupling a gearbox input to the low-pressure turbine;
   coupling a gearbox output to the counter-rotating fan assembly; and
   coupling a thrust spring between the gearbox input and the gearbox output to at least partially absorb the thrust generated by the counter-rotating fan assembly the thrust spring formed unitarily with the first and second portions, a plurality of openings formed through the thrust spring to facilitate adjusting the thrust absorbed by the thrust spring.

2. A method in accordance with claim 1 wherein the gearbox includes a support structure including a first portion and a second portion, said method further comprising coupling the thrust spring between the first and second portions.

3. A method in accordance with claim 1 further comprising coupling a thrust bearing within the second portion to at least partially absorb the thrust generated by the counter-rotating fan assembly.

4. A method in accordance with claim 3 further comprising coupling an outer race of the thrust bearing assembly to the frame.

5. A method in accordance with claim 1 further forming a plurality of planetary gear support structures unitarily with the first portion.

6. A gearbox comprising:
   a support structure;
   at least one sun gear coupled within said support structure; and
   a plurality of planetary gears coupled within said support structure, said support structure comprising
   a first portion,
   an axially aft second portion, and
   a thrust spring coupled between said first and second portions, said thrust spring comprising a plurality of openings extending therethrough, at least one of the quantity of openings and the size of the openings based on the thrust absorbed by the thrust spring.

7. A gearbox in accordance with claim 6 wherein said first portion, said second portion, and said thrust spring are formed unitarily.

8. A gearbox in accordance with claim 6 further comprising:
   an input coupled to a gas turbine engine low-pressure turbine;
   at least one output coupled to a counter-rotating fan assembly, said thrust spring configured at least partially absorb the thrust generated by the counter-rotating fan assembly.

9. A gearbox in accordance with claim 6 wherein said gearbox further comprises a thrust bearing coupled within said support structure.

10. A gearbox in accordance with claim 6 wherein said support structure further comprises a plurality of planetary gear support structures formed unitarily with said support structure.

11. A gearbox in accordance with claim 10 wherein said thrust bearing comprises an outer race that is coupled to a gas turbine engine frame and a radially inner race that is coupled to said counter-rotating fan assembly.

12. A turbine engine assembly comprising:
   a core turbine engine;
   a low-pressure turbine coupled to said core turbine engine;
   a gearbox coupled to said low-pressure turbine; and
   a counter-rotating fan assembly coupled to said gearbox, said gearbox comprising
   a first portion;
   an axially aft second portion; and
   a thrust spring coupled between said first and second portions, said thrust spring comprises a plurality of openings extending therethrough, the quantity of openings based on the thrust absorbed by the thrust spring.

13. A turbine engine assembly in accordance with claim 12 wherein said first portion, said second portion, and said thrust spring are formed unitarily.

14. A turbine engine assembly in accordance with claim 12 further comprising:
   an input coupled to said low-pressure turbine;
   at least one output coupled to said counter-rotating fan assembly, said thrust spring configured at least partially absorb the thrust generated by the counter-rotating fan assembly.

15. A turbine engine assembly in accordance with claim 12 wherein said gearbox further comprises a thrust bearing coupled within said support structure.

16. A turbine engine assembly in accordance with claim 12 wherein said support structure further comprises a plurality of planetary gear support structures formed unitarily with said support structure.

* * * * *